United States Patent
Akuzawa et al.

(10) Patent No.: US 10,243,413 B2
(45) Date of Patent: Mar. 26, 2019

(54) RESONANCE TYPE POWER TRANSMISSION DEVICE

(71) Applicant: Mitsubishi Electric Engineering Company, Limited, Chiyoda-ku (JP)

(72) Inventors: Yoshiyuki Akuzawa, Chiyoda-ku (JP); Yuki Ito, Chiyoda-ku (JP); Hiroshi Matsumori, Chiyoda-ku (JP)

(73) Assignee: Mitsubishi Electric Engineering Company, Limited, Chiyoda-ku (JP)

( * ) Notice: Subject to any disclaimer, the term of this patent is extended or adjusted under 35 U.S.C. 154(b) by 28 days.

(21) Appl. No.: 15/531,550

(22) PCT Filed: Jan. 28, 2015

(86) PCT No.: PCT/JP2015/052353
§ 371 (c)(1),
(2) Date: May 30, 2017

(87) PCT Pub. No.: WO2016/121029
PCT Pub. Date: Aug. 4, 2016

(65) Prior Publication Data
US 2018/0294680 A1 Oct. 11, 2018

(51) Int. Cl.
*H02J 50/70* (2016.01)
*H01F 38/18* (2006.01)
(Continued)

(52) U.S. Cl.
CPC ............ *H02J 50/70* (2016.02); *H01F 27/365* (2013.01); *H01F 38/14* (2013.01); *H01F 38/18* (2013.01);
(Continued)

(58) Field of Classification Search
CPC .. H02J 50/70; H02J 50/12; H02J 50/20; H02J 50/40; H02J 7/025; H02J 17/00; H01F 27/365; H01F 38/14; H04B 5/0037
(Continued)

(56) References Cited

U.S. PATENT DOCUMENTS

| 3,317,873 A | 5/1967 | Himmelstein et al. |
| 2014/0008995 A1 | 1/2014 | Kanno |

(Continued)

FOREIGN PATENT DOCUMENTS

| JP | 2014-090648 A | 5/2014 |
| JP | 2014-090650 A | 5/2014 |

(Continued)

OTHER PUBLICATIONS

International Search Report dated Mar. 24, 2015 in PCT/JP2015/052353, filed Jan. 28, 2015.
(Continued)

*Primary Examiner* — Carlos D Amaya
(74) *Attorney, Agent, or Firm* — Oblon, McClelland, Maier & Neustadt, L.L.P.

(57) ABSTRACT

Disclosed is a resonance type power transmission device in which a plurality of systems having respective transmitters and receivers 3 are arranged opposite to each other and each of the systems transmits electric power having a single frequency, each of the transmitters and receivers having a transmission antenna 5 and a reception antenna 6 which are disposed so as to be fitted to each other, and in which a magnetic sheet 7 is disposed in a portion between the systems, opposite to the transmitters and receivers 3 at a distance, from each of the transmitters and receivers 3, of $\frac{1}{10}$ or more of the minimum of the outer diameters of the transmission antenna 5 and the reception antenna 6.

12 Claims, 11 Drawing Sheets

(51) Int. Cl.
*H02J 50/40* (2016.01)
*H02J 50/12* (2016.01)
*H02J 50/20* (2016.01)
*H01F 27/36* (2006.01)
*H01F 38/14* (2006.01)

(52) U.S. Cl.
CPC .............. *H02J 50/12* (2016.02); *H02J 50/20* (2016.02); *H02J 50/40* (2016.02)

(58) Field of Classification Search
USPC ........................................................ 307/104
See application file for complete search history.

(56) References Cited

U.S. PATENT DOCUMENTS

| | | |
|---|---|---|
| 2014/0021795 A1 | 1/2014 | Robertson et al. |
| 2015/0280447 A1 | 10/2015 | Akuzawa et al. |

FOREIGN PATENT DOCUMENTS

| | | |
|---|---|---|
| JP | 2014-124056 A | 7/2014 |
| JP | 2015-002310 A | 1/2015 |
| WO | 2014/006895 A1 | 1/2014 |

OTHER PUBLICATIONS

Extended European Search Report dated Jul. 12, 2018 in Patent Application No. 15879926.2, 7 pages.
Decision to Grant a Patent dated May 25, 2015, issued in Japanese Patent Application No. 2015-518098 (with English translation).

(a)

(b)

(c)

(a)

(b)

RESONANCE TYPE POWER TRANSMISSION DEVICE

FIELD OF THE INVENTION

The present invention relates to a resonance type power transmission device in which a plurality of systems having respective transmitters and receivers are arranged opposite to each other and each of the systems transmits electric power having a single frequency, each of the transmitters and receivers having a transmission antenna and a reception antenna which are disposed so as to be fitted to each other.

BACKGROUND OF THE INVENTION

Conventionally, a multiplexing transmission system that implements efficient multiplexing power transmission by using only a fixed single frequency is known (for example, refer to patent reference 1). In the multiplexing transmission system disclosed in this patent reference 1, a plurality of systems each having a transmitters and receiver configured with a transmission antenna and a reception antenna are disposed, and, by keeping a distance between the antennas of adjacent systems in such a way that the coefficient of coupling between the adjacent systems becomes equal to or lower than a predetermined value, the interaction between the systems is reduced. Further, by inserting an electromagnetic shielding material between the systems, the interaction is reduced.

RELATED ART DOCUMENT

Patent Reference

Patent reference 1: Japanese Unexamined Patent Application Publication No. 2014-90650

SUMMARY OF THE INVENTION

Problems to be Solved by the Invention

It is assumed in the multiplexing transmission system disclosed in patent reference 1 that the plurality of systems each having a transmitter and receiver are arranged on a plane. In contrast with this, in a case in which the above-mentioned multiplexing transmission system is applied to a rotary member, such as a rotary joint or a slip ring, the transmission antenna and the reception antenna of each transmitter and receiver are arranged so as to be fitted to each other and the plurality of systems each having a transmitter and receiver are arranged opposite to each other. In this case, because the transmission antenna and the reception antenna of each system are opposite to the transmission antenna and the reception antenna of an adjacent system, the magnetic flux is easily combined with another magnetic flux and hence the interaction increases. A problem is therefore that the power transmission independent of each system and increase in the efficiency of the power transmission cannot be implemented unless the electromagnetic shielding material is placed appropriately. Further, the downsizing of the multiplexing transmission system cannot be implemented.

The present invention is made in order to solve the above-mentioned problems, and it is therefore an object of the present invention to provide a resonance type power transmission device in which a plurality of systems having respective transmitters and receivers are arranged opposite to each other and each of the systems transmits electric power having a single frequency, each of the transmitters and receivers having a transmission antenna and a reception antenna disposed so as to be fitted to each other, and which can reduce the interaction.

Means for Solving the Problem

In accordance with the present invention, there is provided a resonance type power transmission device in which a plurality of systems having respective transmitters and receivers are arranged opposite to each other and each of the systems transmits electric power having a single frequency, each of the transmitters and receivers having a transmission antenna and a reception antenna which are disposed so as to be fitted to each other, the resonance type power transmission device including a magnetic sheet disposed in a portion between the systems, opposite to the transmitters and receivers at a distance, from each of the transmitters and receivers, of $\frac{1}{10}$ or more of the minimum of the outer diameters of the transmission antenna and the reception antenna.

Advantages of the Invention

Because the resonance type power transmission device in accordance with the present invention is configured as above, the interaction can be reduced in the resonance type power transmission device in which the plurality of systems having the respective transmitters and receivers are arranged opposite to each other and each of the systems transmits electric power having a single frequency, each of the transmitters and receivers having the transmission antenna and the reception antenna which are disposed so as to be fitted to each other.

BRIEF DESCRIPTION OF THE FIGURES

FIG. 2(a) is a schematic diagram showing transmitters and receivers and magnetic sheets, FIG. 2(b) is a front view showing each transmitter and receiver of FIG. 2(a), and FIG. 2(c) is a side view of FIG. 2(a);

FIG. 4(a) is a schematic diagram showing the transmitters and receivers and FIG. 4(b) is a diagram showing simulation results;

EMBODIMENTS OF THE INVENTION

Hereafter, the preferred embodiments of the present invention will be explained in detail with reference to the drawings.

Embodiment 1

Figure 1:
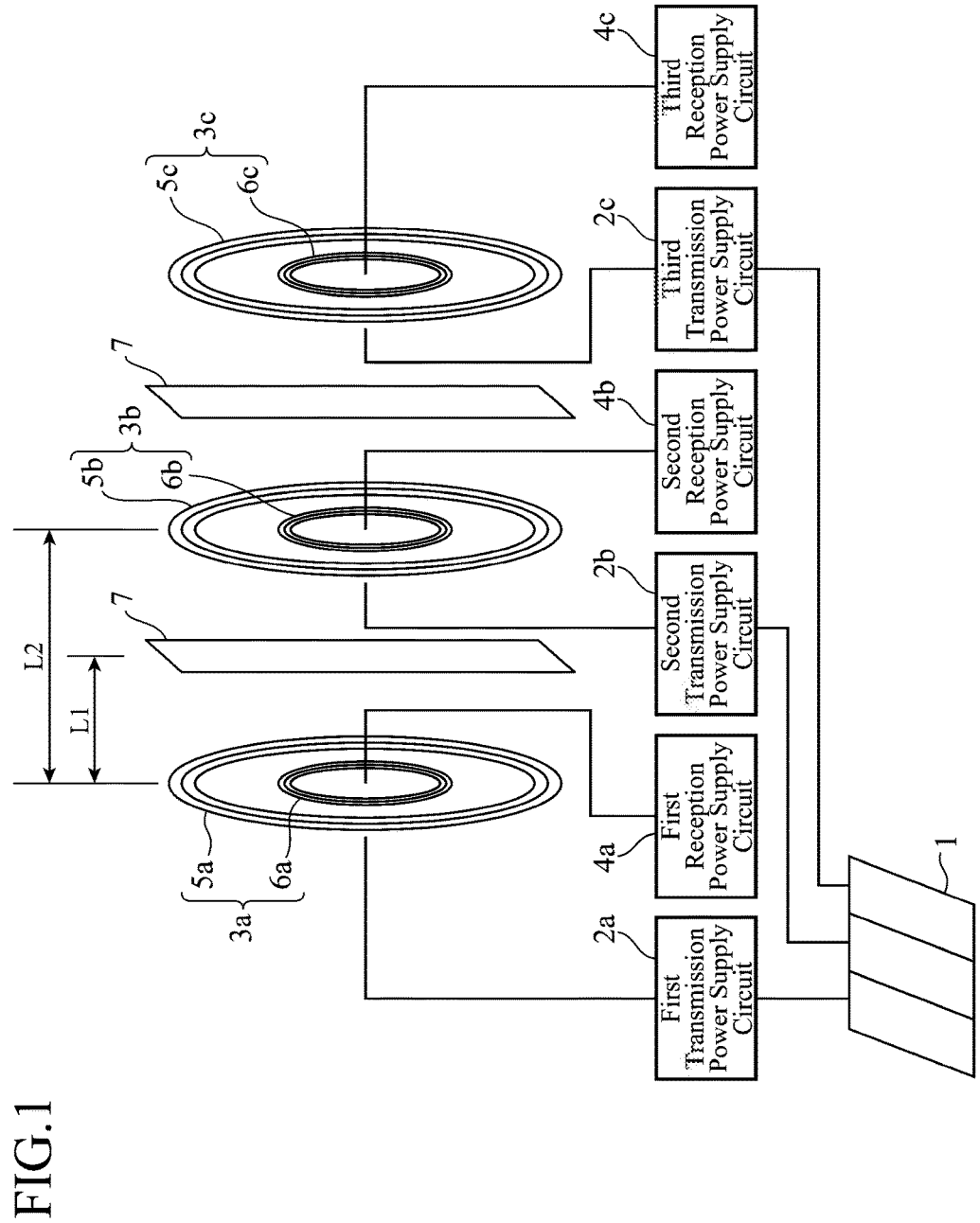
FIG. 1 is a schematic, diagram showing the configuration of a resonance type power transmission device in accordance with Embodiment 1 of the present invention.

FIG. 1 is a schematic diagram, showing the configuration of a resonance type power transmission device in accordance with Embodiment 1 of the present invention. The resonance type power transmission device is configured with a primary power supply 1, a transmission power supply circuit 2, a transmitter and receiver 3, and a reception power supply circuit 4. Further, the transmitter and receiver 3 has a transmission antenna 5 and a reception antenna 6 which are disposed in a rotary member (not shown), such as a rotary joint or a slip ring, and which are arranged so as to be fitted to each other. In order to perform multiplexing power transmission, the resonance type power transmission device includes a plurality of systems each provided with a transmission power supply circuit 2, a transmission antenna 5, a reception antenna 6, and a reception power supply circuit 4 (in the example of FIG. 1, a case in where three systems are disposed is shown and suffix symbols a to c are attached to the reference numerals which denote the functional units, respectively). Further, a magnetic sheet 7 is disposed between the transmitters and receivers 3 of systems.

The primary power supply 1 supplies direct current or alternating current electric power to each transmission power supply circuit 2.

Each transmission power supply circuit 2 is placed between the primary power supply 1 and a transmission antenna 5, and has a function of receiving the direct current or alternating current electric power from the primary power supply 1, and supplying alternating current power having a certain single frequency to the transmission antenna 5 which pairs therewith, and a function of causing a resonance condition on the transmission antenna 5 which pairs therewith to be satisfied by using resonance impedance control. In this case, each transmission power supply circuit tunes to a resonance frequency.

Each transmission antenna 5 transmits the electric power supplied, via the transmission power supply circuit 2 which pairs therewith, from the primary power supply 1 to a reception antenna 6.

Each reception antenna 6 receives the electric power from the transmission antenna 5 which pairs therewith. A case in which each reception antennas 6 is placed inwardly of the transmission antenna 5 is shown in the example of FIG. 1. In contrast with this each transmission antenna 5 can be placed inwardly of the reception antenna 6. The electric power received by this reception antenna 6 is supplied to load equipment (not shown) or the like via a reception power supply circuit 4.

Further, a power transmission method which each transmitter and receiver 3 uses is not limited, and can be either one of a method using magnetic field resonance, that using electric field resonance, and that using electromagnetic induction.

Each reception power supply circuit 4 is placed between a reception antenna 6 and the load equipment or the like, and causes a resonance condition on the reception antenna 6 which pairs therewith to be satisfied by performing input impedance control. In this case, each reception power supply circuit tunes to a resonance frequency.

Each magnetic sheet 7 is intended for reducing the interaction between the transmitters and receivers 3 of systems, and consists of a magnetic body, such as ferrite or amorphous, having a high real part corresponding to magnetic permeability and a low imaginary part, and formed in a sheet shape. This magnetic sheet 7 is placed at a distance (distance L1 shown in FIG. 1), from each adjacent transmitter and receiver 3, of 1/10 or more of the minimum of the outer diameters of the transmission antenna 5 and the reception antenna 6 of the transmitter and receiver 3. In the example of FIG. 1, each magnetic sheet 7 is placed at a distance of 1/10 or more of the outer diameter of the reception antenna 6. Further, in the example of FIG. 1, each magnetic sheet 7 has a surface including a surface which is vertical projection in the axial direction of the transmitter and receiver 3. More specifically, each magnetic sheet 7 is configured in such a way as to, between systems, cover the whole of the transmitter and receiver 3.

Further, not only a magnetic field but also an electric field is radiated from each transmitter and receiver 3. Therefore, in order to prevent this electric field from leaking to any other system, each magnetic sheet 7 can consist of two sheets, and a member (conductor) having a free electron can be disposed between these sheets. As this conductor, a metallic member, such as a copper or aluminum member, a carbon fiber, conductive plastic, or the like can be provided. Further, the conductor is formed in a certain shape, such as a sheet shape, a mesh shape, or a looped shape.

Further, each transmitter and receiver 3 is placed at a distance (distance L2 shown in FIG. 1), from the transmitter and receiver 3 of each adjacent system, of ½ or more of the minimum of the outer diameters of the transmission antenna 5 and the reception antenna 6 thereof. In the example of FIG. 1, each transmitter and receiver 3 is placed at a distance of ½ or more of the outer diameter of the reception antenna 6.

Next, effects of the resonance type power transmission device configured as above will be explained.

Figure 2:
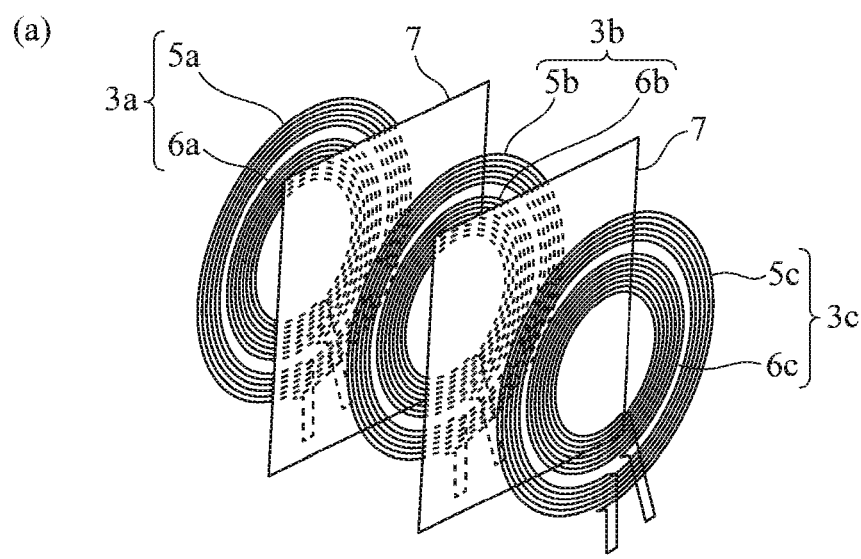
FIG. 2 is a diagram showing a configuration used in order to explain effects of the resonance type power transmission device in accordance with Embodiment 1 of the present invention.
Figure 2:
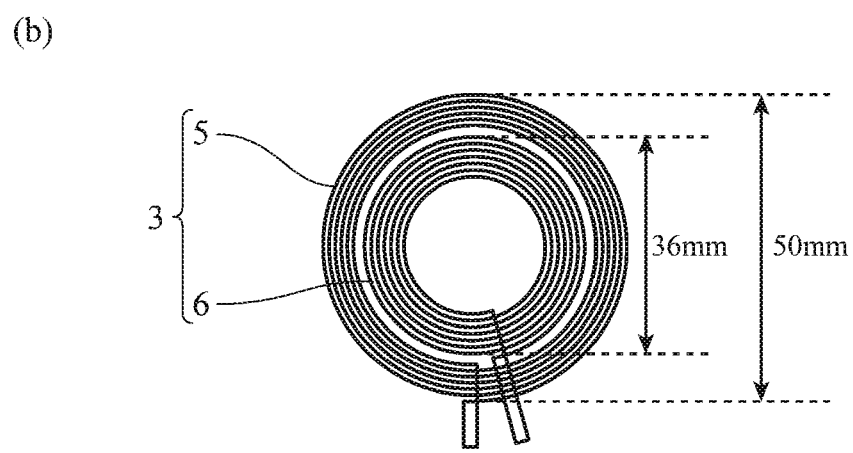
Figure 2:
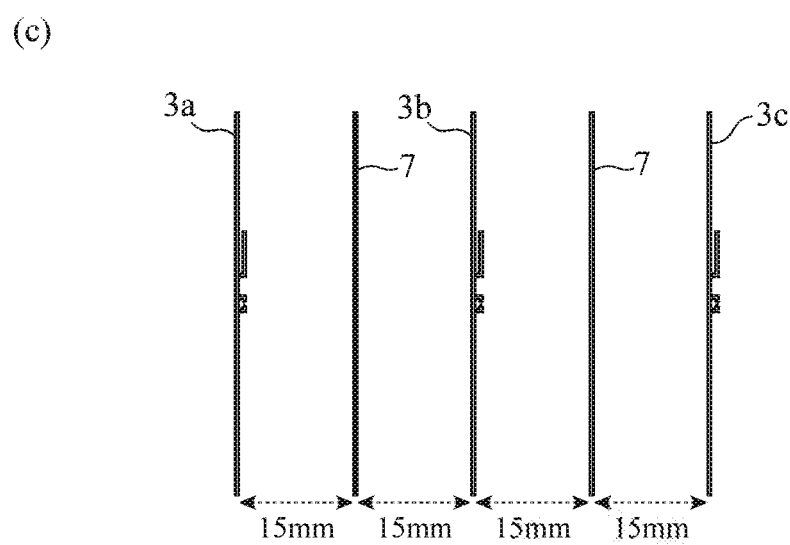

First, an effect which is provided by arranging either a magnetic sheet 7 or a magnetic sheet 7 and a conductor between the transmitters and receivers 3 of systems will be explained by referring to FIGS. 2 and 3. Hereafter, the explanation will be made as to an example, as shown in FIG. 2, of using the three transmitters and receivers 3a to 3c in which the transmission antennas 5a to 5c are arranged outwardly and the reception antennas 6a to 6c are arranged inwardly of the transmission antennas, respectively. Further, the outer diameter of the transmission antennas 5a to 5c and that of the reception antennas 6a to 6c are as shown in FIG. 2(b). Further, the distance between each of the transmitters and receivers 3a to 3c and the magnetic sheet 7 is as shown in FIG. 2(c). More specifically, each magnetic sheet 7 shown in FIG. 2 is placed at a distance of 1/10 or more of the outer diameter of the reception antennas 6a to 6c. Further, also in a case in which not only a magnetic sheet 7 but also a conductor is disposed between the transmitters and receivers 3 of systems, the arrangement is implemented on the same conditions. In this case, ferrite is used as each magnetic sheet 7 and a copper plate is used as each conductor.

Figure 3:
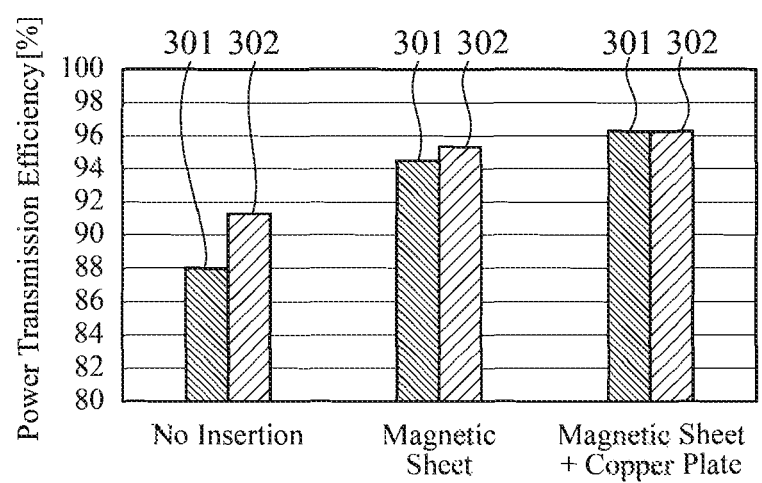
FIG. 3 is a diagram showing the results of simulation using the configuration of FIG. 2.

The results of performing a simulation of the power transmission efficiency in each system, on the conditions shown in FIG. 2, in a case in which nothing is inserted between the transmitters and receivers 3a to 3b of the systems, in a case in which a magnetic sheet 7 is placed between the transmitters and receivers 3a to 3b of the systems, and in a case in which a magnetic sheet 7 and a conductor are placed between the transmitters and receivers 3a to 3b of the systems are shown in FIG. 3. In FIG. 3, a reference numeral 301 denotes the power transmission efficiency in the transmitter and receiver 3b, and a reference numeral 302 shows the power transmission efficiency in each of the transmitters and receivers 3a and 3c. Because the transmitters and receivers 3a and 3c at both ends are configured symmetrically, their power transmission efficiencies are equal.

In the case in which nothing is inserted between the transmitters and receivers 3a to 3b of the systems, as shown in this FIG. 3, the power transmission efficiency in each system is low and there is a large variation among the power transmission efficiencies. In this case, a large variation among the power transmission efficiencies of the systems means that the interaction between systems is large.

In contrast, in the case in which a magnetic sheet 7 is placed between the transmitters and receivers 3a to 3b of the systems, a magnetic flux radiated from each transmitter and receiver 3 is concentrated on this magnetic sheet 7, and flows through the inside of the magnetic sheet 7 without a magnetic loss. As a result, the interaction between systems can be reduced. Accordingly, the power transmission efficiency in each of the systems is improved, and the variation among the power transmission efficiencies becomes small.

The reason why each magnetic sheet 7 is placed at a distance, from each adjacent transmitter and receiver 3, of 1/10 or more of the minimum of the outer diameters of the transmission antenna 5 and the reception antenna 6 is because if each magnetic sheet 7 is placed too close to an adjacent transmitter and receiver 3, the interference between the transmitter and receiver 3 and the magnetic sheet 7 becomes strong and a loss occurs.

Further, in the case in which a magnetic sheet 7 and a conductor are placed between the transmitters and receivers 3a to 3b of the systems, an electric field radiated from each transmitter and receiver 3 is reduced as compared with the case in which only a magnetic sheet 7 is placed. As a result, the power transmission efficiency in each of the systems is further improved, and the variation among the power transmission efficiencies becomes further small.

Further, the distance between the transmitters and receivers 3a to 3b of the systems will be explained by referring to FIG. 4. Hereafter, the explanation will be made as to an example, as shown in FIG. 4(a), of using the three transmitters and receivers 3a to 3c in which the transmission antennas 5a to 5c are arranged outwardly and the reception antennas 6a to 6c are arranged inwardly of the transmission antennas, respectively. It is assumed that the resonance type power transmission device is in a state in which nothing is inserted between the transmitters and receivers 3 of the systems. Further, the outer diameter of the transmission antennas 5a to 5c and that of the reception antennas 6a to 6c are the same as those shown in FIG. 2(b). The results of performing a simulation of the power transmission efficiency in each system, on the conditions shown in FIG. 4(a), when the distance between the transmitters and receivers 3a to 3b of the systems is changed are shown in FIG. 4(b). In FIG. 4(b), a reference numeral 401 denotes the power transmission efficiency in the transmitter and receiver 3b, and a reference numeral 402 shows the power transmission efficiency in each of the transmitters and receivers 3a and 3c. Because the transmitters and receivers 3a and 3c at both ends are configured symmetrically, their power transmission efficiencies are equal.

Figure 4:
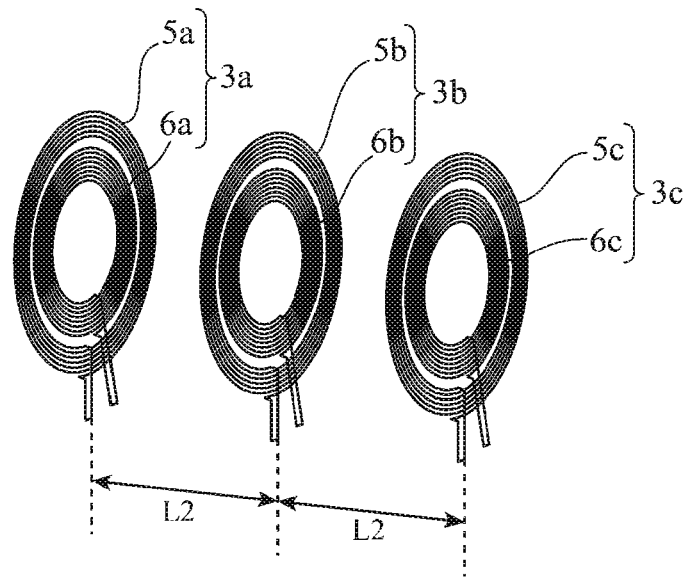
FIG. 4 is a diagram explaining the effect of the resonance type power transmission device in accordance with Embodiment 1 of the present invention.
Figure 4:
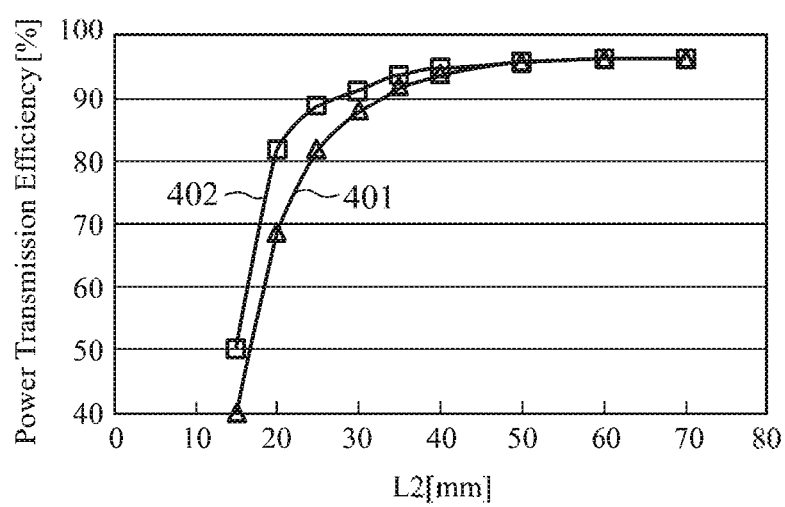

As shown in this FIG. 4(b), the power transmission efficiency is improved by keeping a distance of ½ or more of the outer diameter of the reception antenna 6 which is the minimum outer diameter (in the example of FIG. 4, a distance equal to or longer than 18 mm) between the transmitters and receivers 3a to 3c of the systems.

As mentioned above, because the resonance type power transmission device in accordance with this Embodiment 1 includes a magnetic sheet 7 disposed in a portion between the transmitters and receivers 3 of systems, opposite to the transmitters and receivers 3 at a distance, from each of the transmitters and receivers, of 1/10 or more of the minimum of the outer diameters of the transmission antenna 5 and the reception antenna 6, the interaction can be reduced in the resonance type power transmission device in which the plurality of systems having the respective transmitters and receivers 3 are arranged opposite to each other and each of the systems transmits electric power having a single frequency, each of the transmitters and receivers having the transmission antenna 5 and the reception antenna 6 which are disposed so as to be fitted to each other. As a result, independent and efficient power transmission can be carried out in the transmitters and receivers 3 of the plurality of systems.

Further, by configuring each magnetic sheet 7 with two sheets, and disposing a conductor having a free electron between these two sheets, further efficient power transmission can be carried out.

Figure 5:
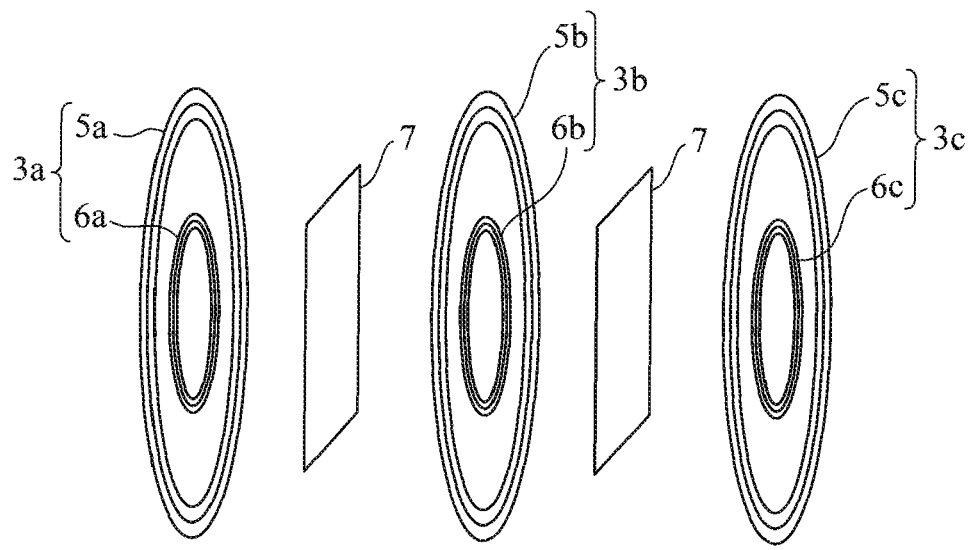
FIG. 5 is a schematic diagram showing another example of the configuration of the resonance type power transmission device in accordance with Embodiment 1 of the present invention.
Figure 6:
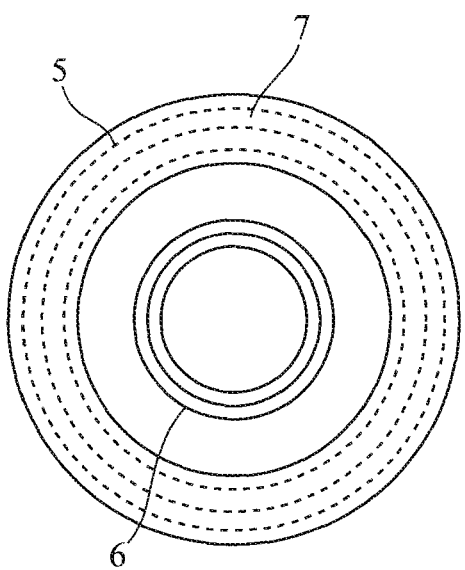
FIG. 6 is a front view showing another example of the configuration of the resonance type power transmission device in accordance with Embodiment 1 of the present invention.

Although the case in which each magnetic sheet 7 is configured in such a way as to cover the whole of each adjacent transmitter and receiver 3 between systems is shown, the present invention is not limited to this example. For example, as shown in FIG. 5, each magnetic sheet 7 can have a surface including a surface which is vertical projection in the axial direction of a reception antenna 6, and can be placed opposite to this reception antenna 6. As an alternative, for example, as shown in FIG. 6, each magnetic sheet 7 can have a surface including a surface which is vertical projection in the axial direction of a transmission antenna 5, and can be placed opposite to this transmission antenna 5. In FIGS. 5 and 6, the primary power supply 1, the transmission power supply circuits 2, and the reception power supply circuits 4 are not illustrated. By thus reducing the area of each magnetic sheet 7, a weight reduction can be achieved particularly in the case in which a conductor, such as a metallic plate, is disposed in each magnetic sheet 7.

Embodiment 2

In Embodiment 1, the configuration in which either each magnetic sheet 7 or each set of a magnetic sheet 7 and a conductor is disposed between the transmitters and receivers 3 of systems, thereby reducing the interaction between the systems is shown.

In contrast, in the resonance type power transmission device, there is a case in which each transmitter and receiver 3 is covered by a cover in order to improve its strength. This cover is made from a resin, a metal, or the like. In a case in which the cover is made from a resin, efficient power transmission independent between systems can be carried out by means of the configuration in accordance with Embodiment 1. In contrast, in a case in which the cover is made from a metal, the magnetic field from each transmitter and receiver 3 interlinks with this metal and an eddy current occurs, and this results in a power loss. Further, the resonance condition between the transmission antenna 5 and the reception antenna 6 changes due to this metal, and efficient power transmission becomes impossible. In addition, because an interaction occurs between the system and another system via this metal, independent power transmission becomes impossible. Therefore, in Embodiment 2, a configuration of making it possible to carry out efficient power transmission independent between systems even in a case in which each transmitter and receiver 3 is covered by a metallic cover will be explained.

Figure 7:
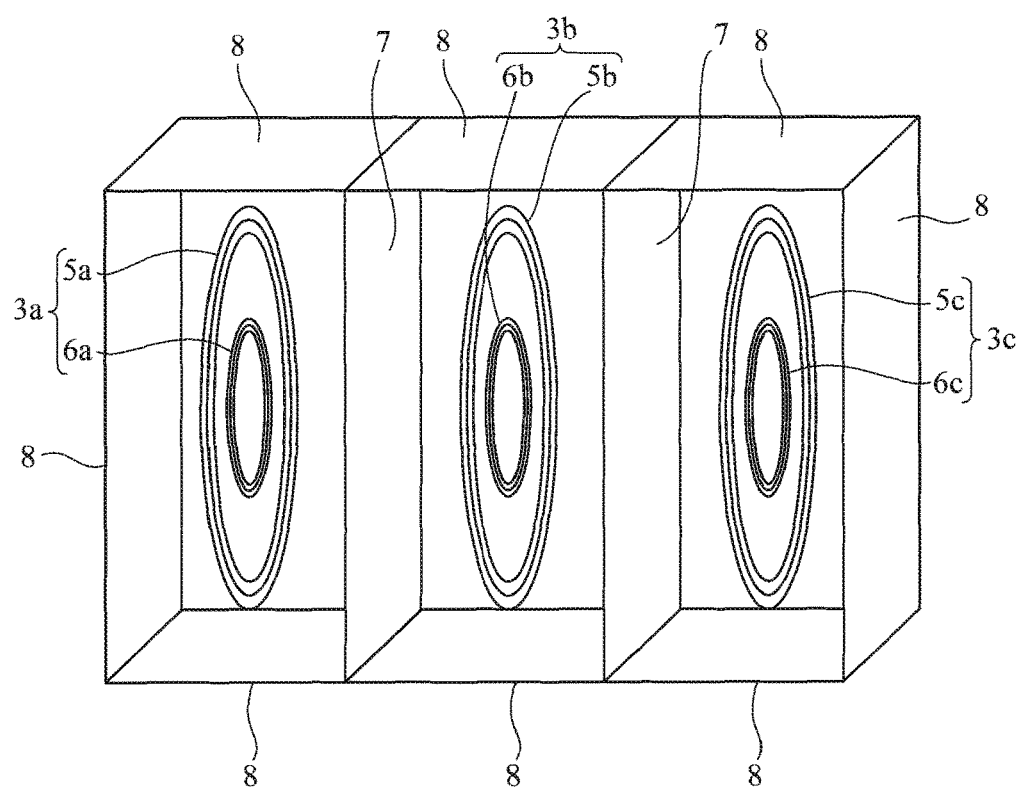
FIG. 7 is a schematic diagram showing the configuration of a resonance type power transmission device in accordance with Embodiment 2 of the present invention.

FIG. 7 is a diagram showing the configuration of a resonance type power transmission device in accordance with Embodiment 2 of the present invention. The resonance type power transmission device in accordance with Embodiment 2 shown in this FIG. 7 additionally includes second magnetic sheets 8 in addition to the configuration of the resonance type power transmission device in accordance with Embodiment 1 shown in FIG. 1. The other components are the same as those of Embodiment 1 and are designated by the same reference numerals, and the explanation of the components will be omitted hereafter. In FIGS. 7 to 12 which will be explained below, a primary power supply 1, transmission power supply circuits 2, and reception power supply circuits 4 are not shown.

The second magnetic sheets 8 are intended for reducing power losses in the metallic cover, and each second magnetic sheet consists of a magnetic body, such as ferrite or amorphous, having a high real part corresponding to magnetic permeability and a low imaginary part, and formed in a sheet shape. Each second magnetic sheet 8 is disposed in a peripheral portion other than a portion between the transmitters and receivers 3 of systems, and is placed at a distance, from the transmitters and receivers 3, of 1/10 or more of the minimum of the outer diameters of the transmission antenna 5 and the reception antenna 6 of each of the transmitters and receivers 3, like each magnetic sheet 7. In the example of FIG. 7, each second magnetic sheet 8 is placed at a distance of 1/10 or more of the outer diameter of the reception antenna 6.

Figure 8:
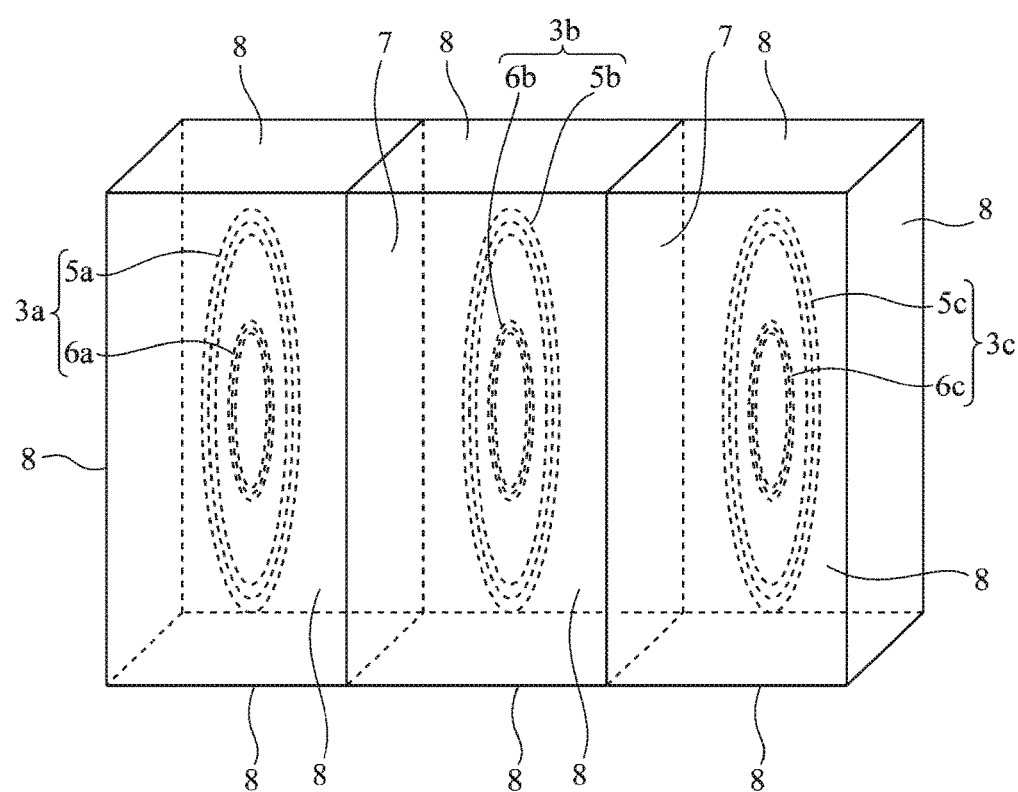
FIG. 8 is a schematic diagram showing another example of the configuration of the resonance type power transmission device in accordance with Embodiment 2 of the present invention.

Although no second magnetic sheet 8 is disposed both on a front side and on a back side of each transmitter and receiver 3 in the example of FIG. 7, all planes surrounding each transmitter and receiver 3 can be alternatively covered by magnetic sheets 7 and 8, as shown in FIG. 8. Further, although no gap is disposed between magnetic sheets 7 and 8 in the example shown in the figure, a gap can be disposed between magnetic sheets 7 and 8.

Further, like in the case of the magnetic sheets 7, in order to prevent an electric field radiated from each transmitter and receiver 3 from leaking, each second magnetic sheet 8 can consist of two sheets, and a member (conductor) having a free electron can be disposed between these sheets. As this conductor, a metallic member, such as a copper or aluminum member, can be provided. Further, the conductor is formed in a certain shape, such as a sheet shape, a mesh shape, or a looped shape.

By thus placing each second magnetic sheet 8 in a peripheral portion other than a portion between the transmitters and receivers 3 of systems, a magnetic flux from each transmitter and receiver 3 can be prevented from reaching the metallic cover. Therefore, no power loss occurs due to each transmitters and receiver 3 being covered by the metallic cover.

The arrangement of the magnetic sheets 7 and 8 are not limited to the examples shown in FIGS. 7 and 8, and the magnetic sheets can be arranged as shown in, for example, FIGS. 9 to 12. Further, although no second magnetic sheet 8 is disposed both on a front side and on a back side of each transmitter and receiver 3 in the examples shown in FIGS. 9 to 12, a second magnetic sheet can be alternatively disposed both on a front side and on a back side of each transmitter and receiver.

Figure 9:
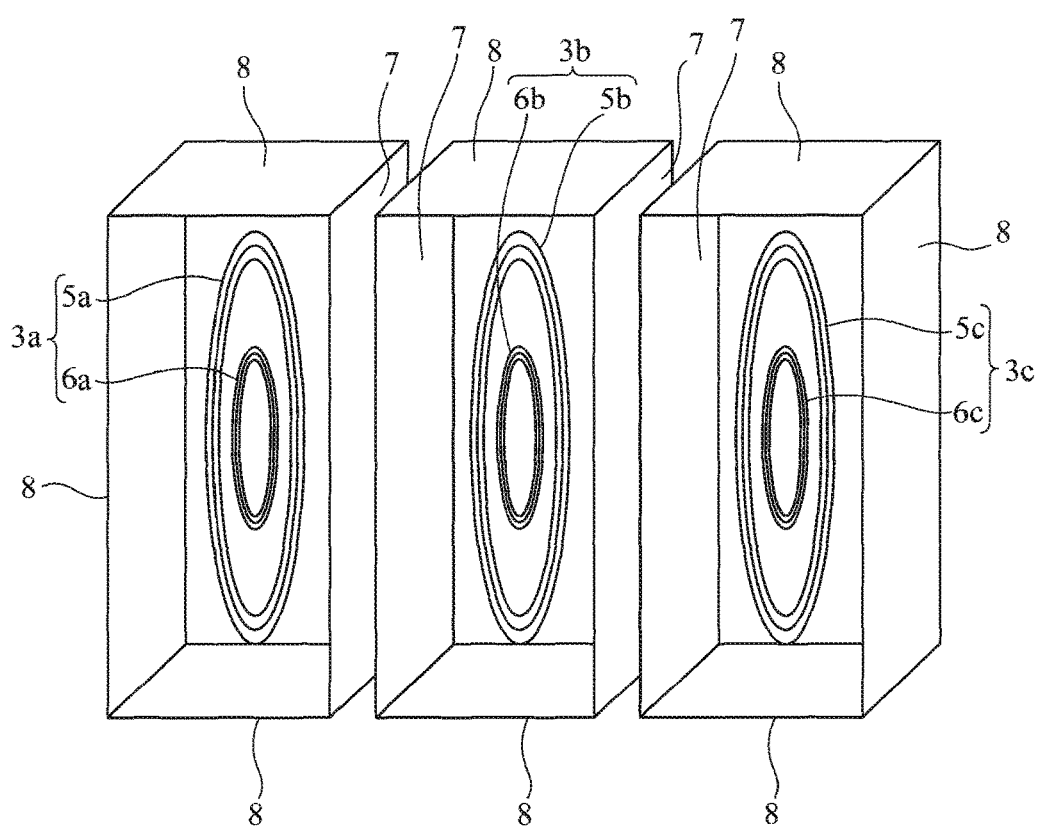
FIG. 9 is a schematic diagram showing another example of the configuration of the resonance type power transmission device in accordance with Embodiment 2 of the present invention.
Figure 10:
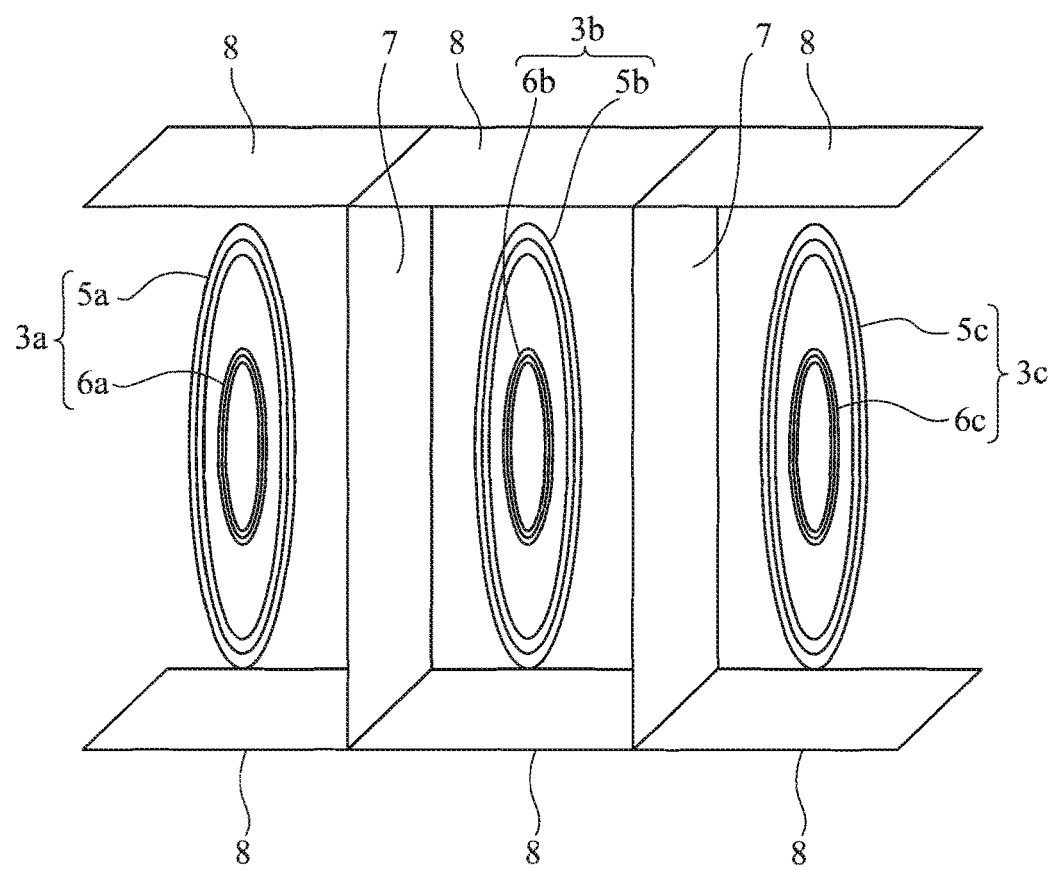
FIG. 10 is a schematic diagram showing another example of the configuration of the resonance type power transmission device in accordance with Embodiment 2 of the present invention.
Figure 11:
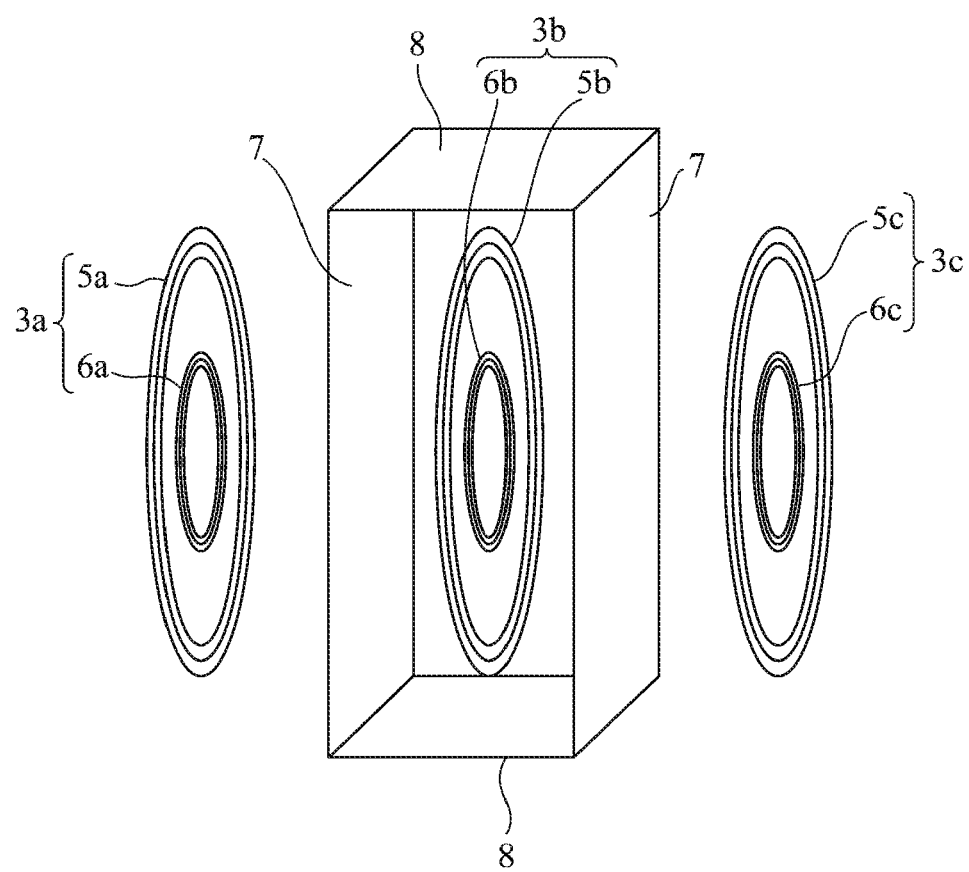
FIG. 11 is a schematic diagram showing another example of the configuration of the resonance type power transmission device in accordance with Embodiment 2 of the present invention.
Figure 12:
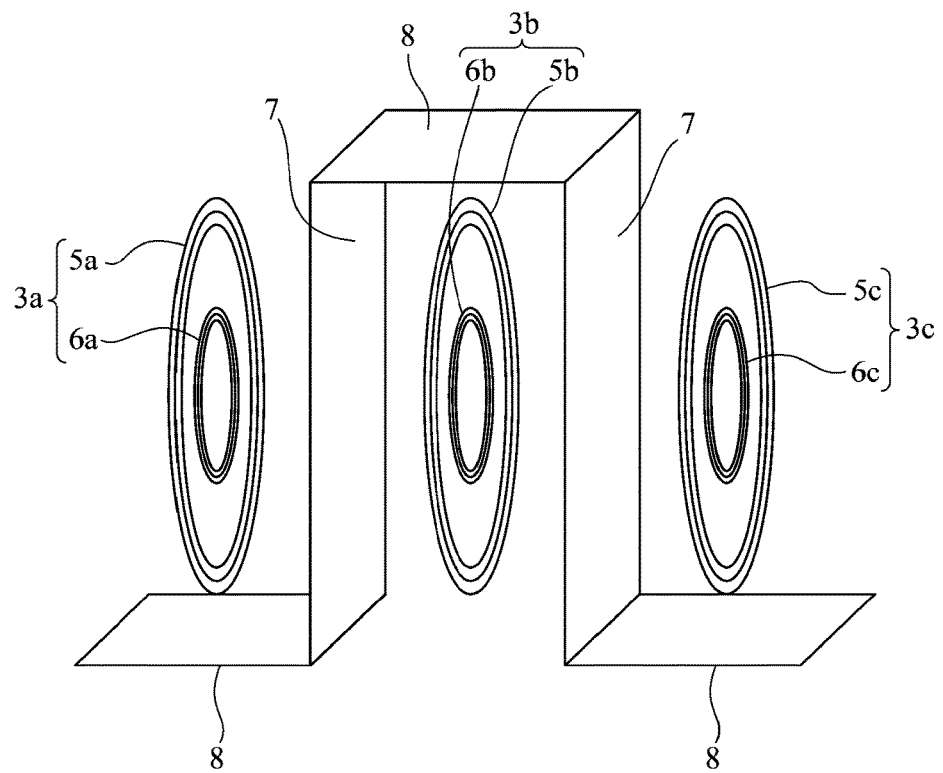
FIG. 12 is a schematic diagram showing another example of the configuration of the resonance type power transmission device in accordance with Embodiment 2 of the present invention.

In the configuration shown in FIG. 9, among the examples shown in FIGS. 7 to 12, in a case in which a second magnetic sheet 8 is disposed both on a front side and on a back side of each transmitter and receiver 3 (in a case in which all planes are covered by magnetic sheets 7 and 8 for each transmitter and receiver 3), the power transmission efficiency is the highest.

Further, while by reducing the number of mounted magnetic sheets 7 and 8, as shown in FIGS. 7, 8, and 10 to 12, with respect to the arrangement shown in FIG. 9, the power transmission efficiency decreases as compared with the case of FIG. 9, the component count can be reduced and a weight reduction can be achieved.

In addition, it is preferable that the second magnetic sheets 8 are arranged in such a way that the spatial distance which the magnetic flux radiated from each transmitter and receiver 3 travels through space until reaching the transmitter and receiver 3 of an adjacent system becomes long. As a result, there is provided an advantage of reducing the interaction between systems by means of the second magnetic sheets 8.

As mentioned above, because the resonance type power transmission device in accordance with this Embodiment 2 includes second magnetic sheets 8 each of which is disposed in a peripheral portion other than a portion between the transmitters and receivers 3 of systems, and is placed at a distance, from the transmitters and receivers 3, of 1/10 or more of the minimum of the outer diameters of the transmission antenna 5 and the reception antenna 6 of each of the transmitters and receivers 3, in addition to the advantages provided by Embodiment 1, there is provided an advantage of being able to perform efficient power transmission independent between the systems even in the case in which each transmitter and receiver 3 is covered by a metallic cover.

Further, in the configurations in accordance with Embodiments 1 and 2, a portion in which the conductor is disposed can be set up properly. For example, in a case in which a cover covering each transmitter and receiver 3 is made from a metal, a magnetic sheet 7 and a conductor can be placed in a portion between the transmitters and receivers 3 of systems and only second magnetic sheets 8 can be placed in a peripheral portion other than the portion because it is not necessary to dispose a conductor in a portion opposite to that cover. Further, even in a case in which a cover covering each transmitter and receiver 3 is made from a resin, in order to achieve a weight reduction, only a second magnetic sheets 3 can be placed in a part of a peripheral portion other than a portion between the transmitters and receivers 3 of systems and a second magnetic sheet 8 and a conductor can be placed in a remaining part of the peripheral portion.

Embodiment 3

Figure 13:
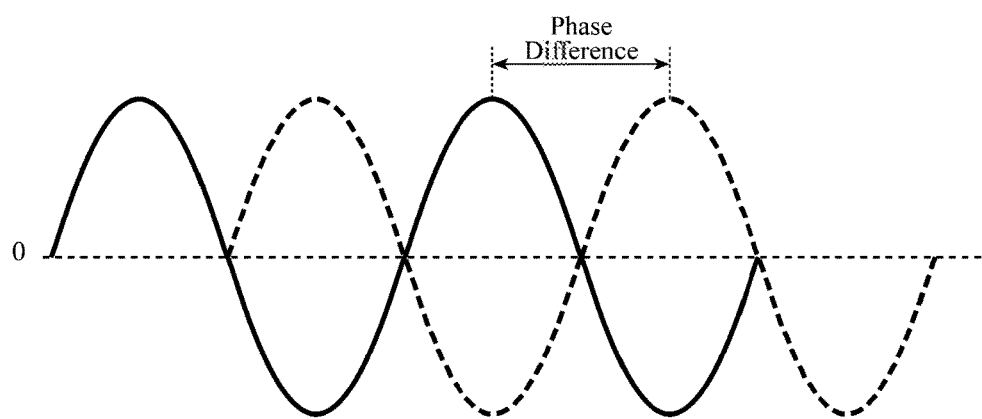
FIG. 13 is a diagram showing a magnetic field phase of each system of a resonance type power transmission device in accordance with Embodiment 3 of the present invention.

In Embodiments 1 and 2, the configuration in which the interaction between the systems is reduced by using the magnetic sheet 7 is shown. In addition to this configuration, by changing the magnetic field phase of each transmitter and receiver 3 between the systems, as shown in FIG. 13, the interaction between the systems can be further reduced. FIG. 13 shows an example in which in the three transmitters and receivers 3a to 3c shown in FIG. 2, the magnetic fields of the transmitters and receivers 3a and 3c, each of which is shown by a solid line, are 180 degrees out of phase with that of the transmitter and receiver 3b, which is shown by a broken line.

In Embodiments 1 to 3, the case in which each of the transmission and reception antennas 5 and 6 consists of a single coil is shown. However, the present invention is not limited to this example, and each coil can consist of a coil for electric supply and a coil for resonance, or can consist of two or more coils.

In addition, while the invention has been described in its preferred embodiments, it is to be understood that an arbitrary combination of two or more of the embodiments can be made, various changes can be made in an arbitrary component in accordance with any one of the embodiments, and an arbitrary component in accordance with any one of the embodiments can be omitted within the scope of the invention.

INDUSTRIAL APPLICABILITY

The resonance type power transmission device in accordance with the present invention can reduce the interaction, and is suitable for use as a resonance type power transmission device or the like in which a plurality of systems having respective transmitters and receivers are arranged opposite to each other and each of the systems transmits electric power having a single frequency, each of the transmitters and receivers having a transmission antenna and a reception antenna which are disposed so as to be fitted to each other.

EXPLANATIONS OF REFERENCE NUMERALS

1 primary power supply, 2 transmission power supply circuit, 3 transmitter and receiver, 4 reception power supply circuit, 5 transmission antenna, 6 reception antenna, 7 magnetic sheet, and 8 second magnetic sheet.

The invention claimed is:

1. A resonance type power transmission device in which a plurality of systems having respective transmitters and receivers are arranged opposite to each other and each of the systems transmits electric power having a single frequency, each of the transmitters and receivers having a transmission antenna and a reception antenna which are disposed so as to be fitted to each other, said resonance type power transmission device comprising:
a magnetic sheet disposed in a portion between said systems, opposite to said transmitters and receivers at a distance, from each of said transmitters and receivers, of $1/10$ or more of a minimum of outer diameters of said transmission antenna and said reception antenna.

2. The resonance type power transmission device according to claim 1, wherein said magnetic sheet includes two sheets, and a conductor disposed between said two sheets.

3. The resonance type power transmission device according to claim 1, wherein each of said transmitters and receivers is placed a distance, from an adjacent one of said transmitters and receivers, of $1/2$ or more of the minimum of the outer diameters of said transmission antenna and said reception antenna.

4. The resonance type power transmission device according to claim 1, wherein said magnetic sheet has a surface including a surface which is vertical projection in an axial direction of said transmission antenna, and is placed opposite to said transmission antenna.

5. The resonance type power transmission device according to claim 1, wherein said magnetic sheet has a surface including a surface which is vertical projection in an axial direction of said reception antenna, and is placed opposite to said reception antenna.

6. The resonance type power transmission device according to claim 1, wherein said resonance type power transmission device includes a second magnetic sheet disposed in a peripheral portion other than said portion between said systems having said respective transmitters and receivers, opposite to said transmitters and receivers at a distance, from each of said transmitters and receivers, of $1/10$ or more of the minimum of the outer diameters of said transmission antenna and said reception antenna.

7. The resonance type power transmission device according to claim 6, wherein said second magnetic sheet includes two sheets, and a conductor disposed between said two sheets.

8. The resonance type power transmission device according to claim 1, wherein each of said transmitters and receivers performs power transmission by using magnetic field resonance.

9. The resonance type power transmission device according to claim 1, wherein each of said transmitters and receivers performs power transmission by using electric field resonance.

10. The resonance type power transmission device according to claim 1, wherein each of said transmitters and receivers performs power transmission by using electromagnetic induction.

11. The resonance type power transmission device according to claim 1, wherein said transmitters and receivers have magnetic field phases different from each other between adjacent systems.

12. The resonance type power transmission device according to claim 1, wherein each of said transmission and reception antennas includes two or more coils.

* * * * *